United States Patent [19]

Ogawa

[11] Patent Number: 5,221,942
[45] Date of Patent: Jun. 22, 1993

[54] CONTROLLING CHARGING OF A FLASH DEVICE

[75] Inventor: Kimiaki Ogawa, Tokyo, Japan

[73] Assignee: Asahi Kogaku Kogyo Kabushiki Kaisha, Tokyo, Japan

[21] Appl. No.: 832,073

[22] Filed: Feb. 6, 1992

[30] Foreign Application Priority Data

Feb. 7, 1991 [JP] Japan ................... 3-102197

[51] Int. Cl.⁵ ............... G03B 15/05; H05B 41/32
[52] U.S. Cl. ..................... 354/418; 354/127.1; 315/241 P
[58] Field of Search ......... 354/418, 127.1, 127.11, 354/127.12, 145.1; 315/241 R, 241 P; 320/1

[56] References Cited

U.S. PATENT DOCUMENTS

| | | | |
|---|---|---|---|
| 3,679,991 | 7/1972 | Wilwerding | 315/241 R X |
| 5,016,038 | 5/1991 | Kobayashi et al. | 354/418 |
| 5,034,662 | 7/1991 | Nishida et al. | 354/127.1 |

FOREIGN PATENT DOCUMENTS

2083300 3/1982 United Kingdom.
2230663 10/1990 United Kingdom.

*Primary Examiner*—W. B. Perkey
*Attorney, Agent, or Firm*—Sandler Greenblum & Bernstein

[57] ABSTRACT

A flashing device that emits light toward an object, in which a condenser for supplying electricity to a light emitting member is charged by a charging circuit. A timer is provided for measuring a charging period of time necessitated for charging the condenser to at least a predetermined voltage. A charging prohibit period is determined in accordance with the charging period measured by the timer. The charging of the condenser is prohibited for the determined period of time after the light emitting member emits light. Further, the charging prohibit period is compensated in accordance with the voltage of the power source for supplying electricity to the charging circuit.

23 Claims, 7 Drawing Sheets

What is claimed is:

CONTROLLING CHARGING OF A FLASH DEVICE

BACKGROUND OF THE INVENTION

The present invention relates to a flashing device for cameras, and more particularly, to a flashing device in which a charging of a condenser for supplying electricity to a light emitting member is controlled after the emission of the light.

A flashing device can emit light at a specified voltage (hereinafter referred to as a first voltage), however, it is desirable to apply a voltage (hereinafter referred to as the second voltage) which is higher than the first voltage to the flashing device, in order to obtain the maximum luminous energy of the flashing device.

Conventionally, charging of a condenser for supplying voltage to the flashing device is performed through a voltage increasing circuit which is connected with a power source. However, when the recharging of the condenser to the second voltage (hereinafter referred to as a full charge) and light emission of the flash are successively repeated, elements such as transistors or a transformer in the voltage increasing circuit are undesirably heated and the voltage increasing circuit may be burnt or damaged.

Therefore, in order to prevent such problems, a device is suggested in which recharging is prohibited for a predetermined period of time after charging has been finished or flash light has been emitted.

In such a device, however, in order to allowing the flash light emission and full charge to be repeatedly performed, a recharge prohibited time should be specified for a sufficiently long period of time so that the voltage increasing circuit is not undesirably heated.

If the recharge prohibited period is specified for a long time, however, there may arises a problem that the flash light emission can not be used immediately after the light emission, and promptness of the flashing device become lowered.

SUMMARY OF THE INVENTION

It is therefore an object of the present invention to provide an improved flashing device in which the recharging of a condenser for supplying voltage of a flash light can be executed as soon as possible after the light emission without excessive heating of a voltage increasing circuit for charging the condenser.

For the above object, according to the present invention, there is provided a flashing device for emitting light, comprising means for emitting light, a condenser that is chargeable and supplies electricity to the means for emitting light, and means for charging the condenser, the flashing device further comprising:

means for measuring a charging period of a time necessitated for charging the condenser to at least a predetermined voltage;

means for determining a charging prohibit period in accordance with the charging period measured by the measuring means; and means for prohibiting the charging of the condenser for the charging prohibit period when it is determined by determining means that said emitting means emits light.

Optionally, the flashing device further comprises:

a power source for supplying electricity to the charging means;

means for detecting a voltage of the power source; and means for compensating the charging, prohibit period determined by the determining means in accordance with the voltage of the power source. With this construction, if the voltage of the power source is changed with respect to the specified voltage, the charging prohibit period is varied since an electric current changes and an amount of heat generated in the charging means varies.

Further, the determining means determines the charging prohibit period in such a fashion that the longer the charging period measured by the measuring means is, the longer the charging prohibit period is.

Furthermore, a means for stopping the charging is provided for when the condenser is charged to another predetermined voltage which is higher than the predetermined voltage, the determining means determining the charging prohibit period when the charging is stopped.

Further, the flashing device can be associated with a camera, and the camera comprises means for determining whether flash light is to be emitted when a shooting is executed, the light emitting means emits light when it is determined by the camera determining means that the flash light is necessary and when a shutter of the camera is driven.

Optionally, the charging means stops charging when the shutter is driven.

According to another aspect of the invention, there is provided a method for controlling a charging means provided in a flashing device, the flashing device having a condenser for supplying electricity to the light emitting means, the condenser being charged by the charging means, and a power source for supplying electricity to the charging means, the method comprising steps of:

charging the condenser;

detecting a charged voltage of the condenser;

measuring a charging period of time necessitated for charging the condenser to at least a predetermined voltage;

determining a charging prohibit period in accordance with the charging period; and prohibiting the charging of the condenser for the charging prohibit period after the light emitting means emits light.

Optionally, the method further comprises:

detecting a voltage of the power source; and compensating the charging prohibit period in accordance with the detected voltage of the power source.

According to a further aspect of the invention, there is provided a camera having a flashing device for emitting light, comprising means for emitting light, a condenser for being charged and supplying electricity to the means for emitting light, and means for charging the condenser, the camera further comprising:

means for detecting a charged voltage of the condenser;

means for measuring a charging period of time necessitated for charging the condenser to at least a predetermined voltage;

means for determining a charging prohibit period in accordance with the charging period measured by the measuring means; and means for prohibiting the charging of the condenser for the charging prohibit period when it is determined by the determining means that the light emitting means emits light.

According to still further aspect of the invention, there is provided a flashing device for emitting light, comprising means for emitting light, a condenser for being charged and supplying electricity to the light emitting means, and means for charging the condenser, the flashing device further comprising:

means for prohibiting the charging of the condenser for a predetermined period after the light emitting means emits light;

a power source for supplying electricity to the charging means;

means for detecting a voltage of the power source; and means for compensating the predetermined period in accordance with the voltage of the power source. With this flashing device, the recharge prohibit period can be changed in response to the change of the power source for supplying electricity to the charging means.

According to still another aspect of the invention, there is provided a flashing device for emitting light, comprising means for emitting flash light, a condenser for being charged to supply electricity to the emitting means, and means for charging the condenser, the flashing device further comprising:

means for judging the magnitude of a heat generated by the charging means; and means for inhibiting the charging operation of said means for charging in such a fashion that the more heat generated by the charging means, the longer a period for which the charging operation is inhibited. Thus, the heat generated by the charging means is not detected, but judged, and the charging is inhibited so as that the charging means is not overheated.

Optionally, said means for judging judges the magnitude of the heat of the charging means such that the longer a period necessitated for charging the condenser, the more heat that is generated by the charging, whereby the charging operation is inhibited such that the longer a period necessitated for charging the condenser, the longer the period for which the charging operation is inhibited.

Further, the flashing device further comprises:

a power source for supplying electricity to the charging means; and means for shortening the period for which the charging operation is inhibited as the voltage of the power source is relatively low.

DESCRIPTION OF THE EMBODIMENTS

Figure 1:
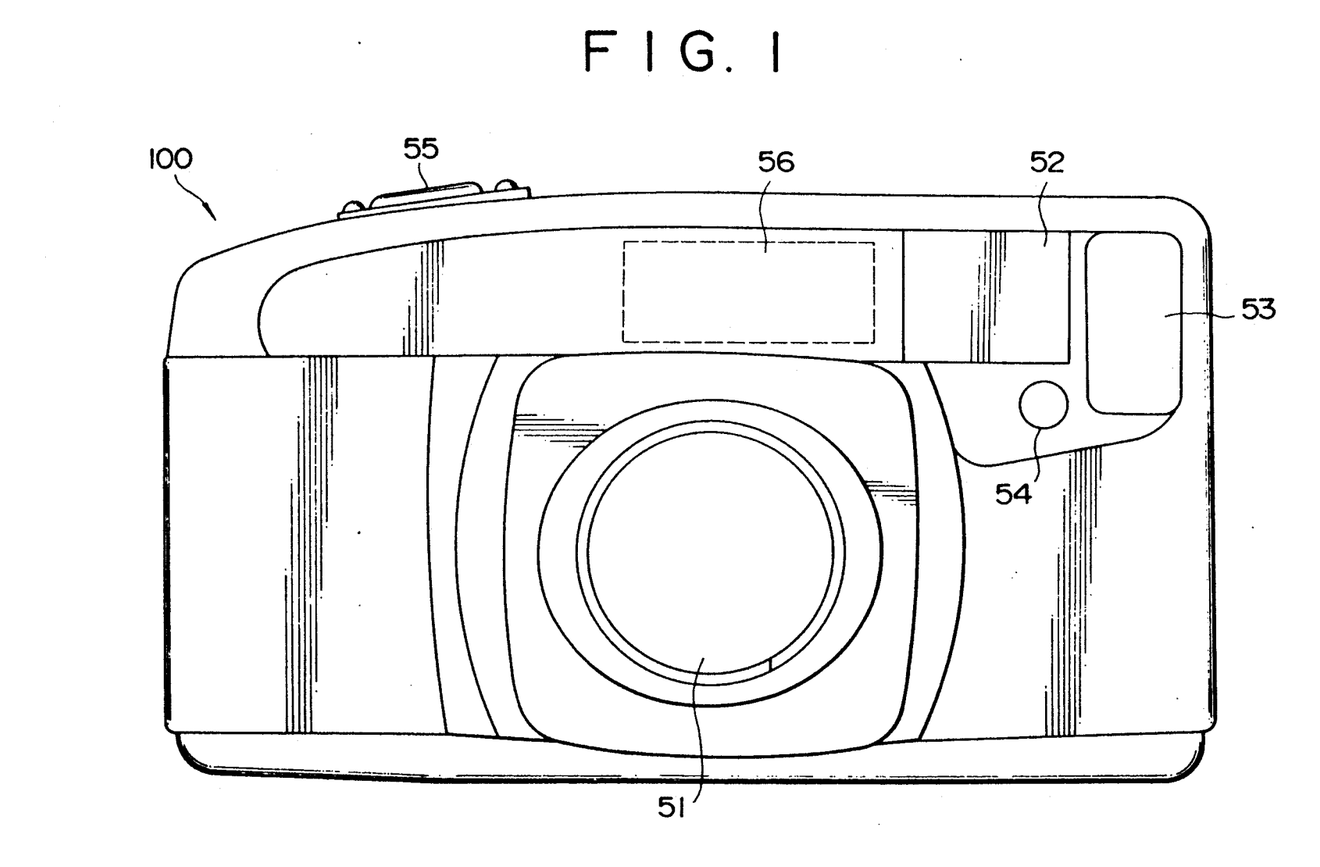
FIG. 1 is a front view of a camera that includes a flashing device embodying the present invention.

FIG. 1 shows a front view of a camera 100 that is provided with a flashing device embodying the present invention. The camera 100 is a compact type lens shutter camera which comprises a lens 51, a finder 52, a light emitting window 53 of the flashing device, a CdS sensor 54 for photometry sensing, a release button 55, and a distance measurement device 56.

Figure 2:
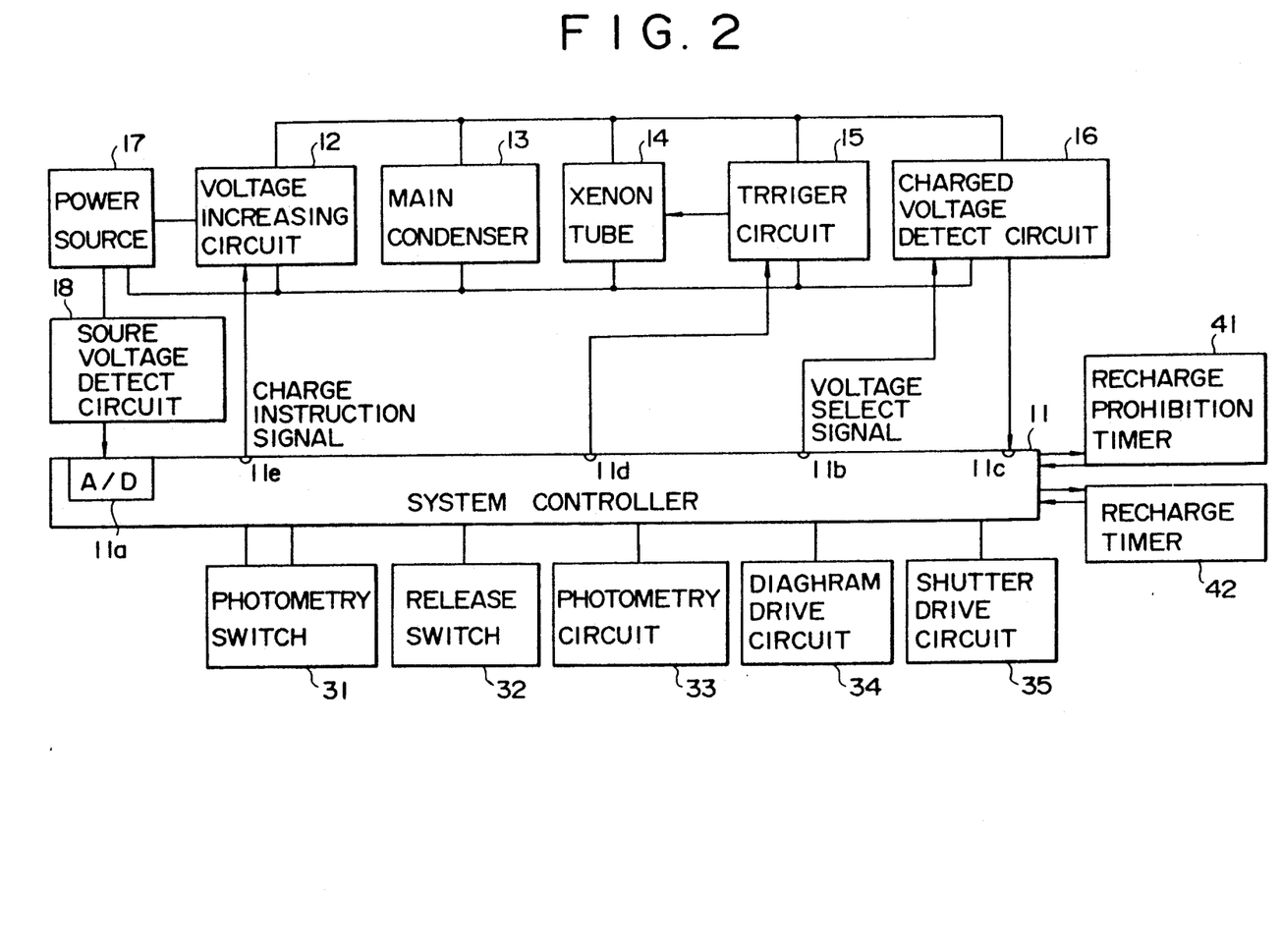
FIG. 2 is a block diagram of a camera of FIG. 1A.

FIG. 2 shows a block diagram of the camera 100 of FIG. 1. A system controller 11 comprises a microcomputer for controlling a flashing device as well as various controls of the camera.

The flashing device comprises a voltage increasing circuit 12, a main condenser 13, a xenon tube 14, a trigger circuit 15, and a voltage detecting circuit 16 which are connected in parallel. With this construction, an accumulated voltage of the main condenser 13 (for example, 300 V) is applied to the xenon tube 14. The xenon tube 14 commences its discharge upon receiving a trigger voltage (for example, 4 kV) applied by the trigger circuit 15, and emits light at a luminous energy corresponding to the charged voltage of the main condenser 13. The trigger circuit 15 outputs the trigger voltage according to a trigger instruction signal inputted from port 11d of the system controller 11. The voltage increasing circuit 12 receives the voltage from a power source 17 and raises it, applies the raised voltage to the main condenser 13 for charging it. The charging starts when a switching-element, such as a transistor, is set to an ON state in response to a charge instruction signal which is inputted from port 11e of the system controller 11.

The voltage detecting circuit 16 detects the charged voltage of the main condenser 13, and outputs a charged level signal in accordance with the magnitude of the charged voltage of the main condenser 13 to a port 11c of the system controller 11. Namely, the charged voltage detecting circuit 16 outputs a low (L) signal of, for example, about 0 V when the charged voltage of the main condenser 13 is more than or equal to a predetermined voltage value, and outputs a high (H) signal of, for example, about 5 V when the voltage of the main condenser 13 is lower than the predetermined voltage value. In the present invention, the charged voltage detecting circuit 16 is capable of detecting first and second voltage values (i.e., 270 V and 330 V) of the charged voltage of the main condenser 13. One of the first and second voltage values to be detected are selectively set by a value change signal inputted from the system controller 11. A source voltage detecting circuit 18 detects the voltage of the power source 17. The voltage value detected by the source voltage detecting circuit 18 is transmitted to an A/D converter 11a of the system controller 11.

Figure 3:
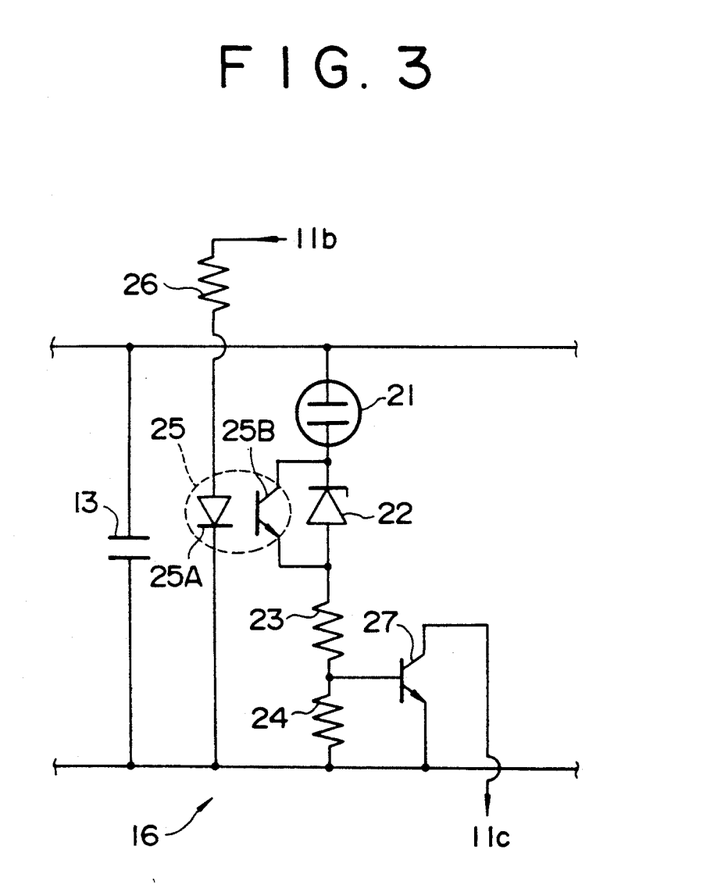
FIG. 3 shows a voltage detecting circuit for detecting a charged condition of a condenser used with the flashing device.

FIG. 3 shows an example of a composition of the charged voltage detecting circuit 16.

In the figure, a neon tube 21, a Zener diode 22, resistors 23 and 24 that are connected in series, and the charged voltage detecting circuit 16 is connected in parallel with the main condenser 13. A phototransistor 25B, which constitutes a photosensor unit of a photocoupler 25 is connected in parallel with the zener diode 22. The light-emitting diode 25A, which constitutes a light-emitting unit of a photocoupler 25, is connected to port 11b of the system controller 11 through the resistor 26. A base of the transistor 27 is connected at the point where the resistors 23 and 24 are connected, and a collector of the transistor 27 is connected to port 11c of the system controller 11.

In the present embodiment, it is so designed that the neon tube 21 is turned ON at 270 V and the Zener diode is turned ON at 60 V.

When a high signal of, for example, 5 V is transmitted from the port 11b of the system controller 11 to the charged voltage detecting circuit 16 as a detect voltage select signal, the light-emitting diode 25A is illuminated and the phototransistor 25B is turned ON. Thus, the neon tube 21 is connected to the transistor 27 by way of the phototransistor 25B. Accordingly, when the voltage of the main condenser 13 reaches 270 V or over, the neon tube 21 is turned ON, whereby the transistor 27 is turned ON, and the voltage detecting circuit 16 outputs a low signal to the port 11c of the system controller 11.

When a low signal, for example, of about 0 V is inputted from the port 11b of the system controller 11, the photocoupler 25 is turned OFF. Therefore, the neon tube 21 is connected through the Zener diode 22 to the transistor 27. Accordingly, when the voltage of the main condenser 13 reaches 330 V or over, the neon tube 21 and the Zener diode 22 are turned ON, thereby causing the transistor 27 to be turned ON, and the voltage detecting circuit 16 outputs a low signal to the port 11c of the system controller 11.

In FIG. 2, a photometric switch 31, a release switch 32, a photometric circuit 33, a diaphragm drive circuit 34 and a shutter drive circuit 35, which have been conventionally employed in cameras, are connected to the system controller 11, respectively.

The photometric switch 31 is turned ON when release button 55 provided on camera body 100 is depressed half way. The release switch 32 is turned ON when the release button 55 is fully depressed. The photometric circuit 33 is activated when the photometric switch 31 is turned ON, and it obtains a luminance of the object. The system controller 11 executes a calculation of the adequate shutter speed, the aperture value, etc., in accordance with the obtained luminance of the object, film sensitivity and other information. In accordance with the result of the calculation of the system controller 11, the diaphragm drive circuit 34 drives the diaphragm. Thereafter, when the release switch 32 is turned ON, the shutter mechanism is driven in accordance with the calculated shutter speed, and the photographic shooting is carried out. The aforementioned shooting process is the process wherein the flashing device is not used.

When the flashing device is used in shooting, the aperture value and the shutter speed are set to predetermined values, respectively.

Figure 4:
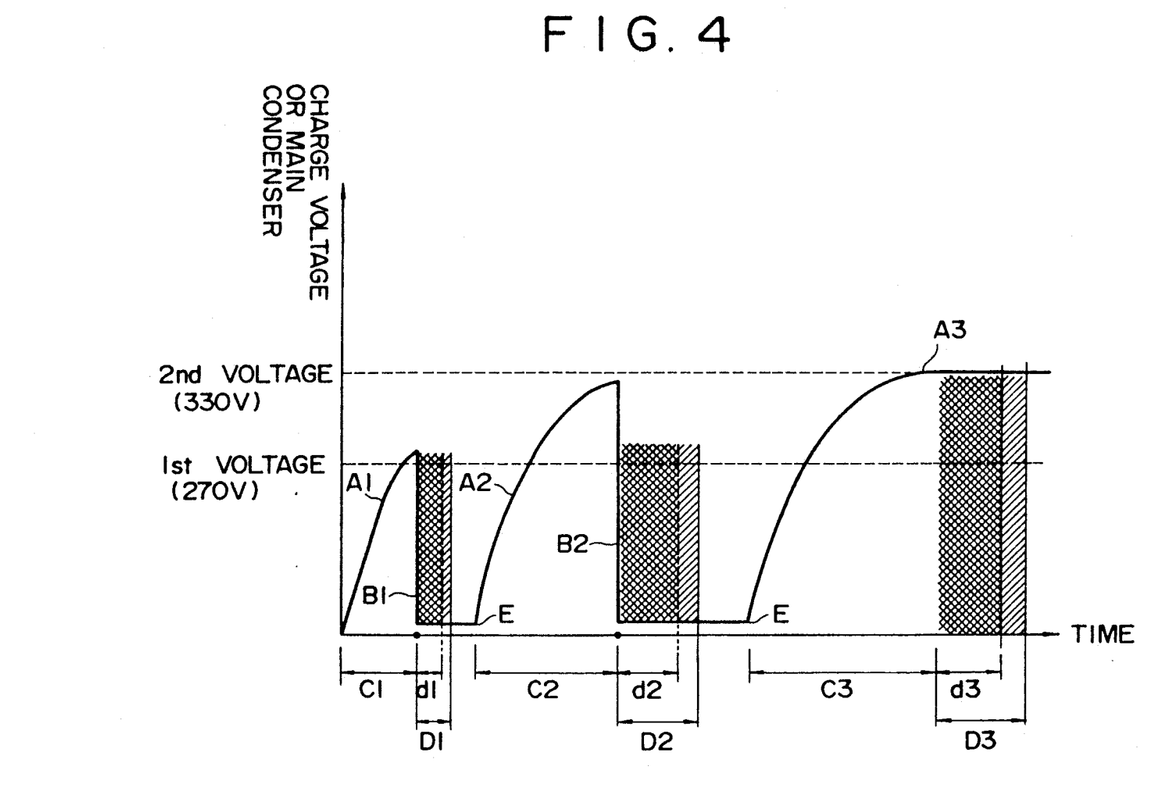
FIG. 4 is a graph showing chronological changes of a charged voltage of the condenser.

FIG. 4 shows chronological changes of the charged voltage of the main condenser 13 according to the present embodiment, which shows the case where the charging starts when the voltage of the main condenser 13 is 0 V.

At the beginning of the charging, a high signal is applied to the charged voltage detecting circuit 16 from port 11b of the system controller 11 as the detect voltage select signal. Thus, the voltage detecting circuit 16 is set so that it detects whether the voltage of the main condenser 13 has reached the first voltage (270 V).

As the voltage of the main condenser 13 is increased smoothly by the voltage applied by the voltage increasing circuit 12, as indicated by a symbol A1 or A2, and when the charged voltage reaches the first charge voltage, the low signal is transmitted to the charged voltage detecting circuit 16 from port 11b of the system controller 16, as the detect voltage select signal.

Upon receipt of the low signal as the detect voltage select signal, the charged voltage detecting circuit 16 changes the voltage to be detected to the second voltage (330 V). When a flash light emission is performed after the voltage of the main condenser 13 reaches the first voltage, the voltage of the main condenser 13 drops rapidly to about 0 V, as indicated by symbol B1 or B2. After the flash light emission, recharging of the main condenser 13 is prohibited in order to discharge the heat of the transistor, etc., of the voltage increasing circuit 12 during a specified time. In the present preferred embodiment, it is deemed that the longer the previous charge period of time C1 or C2 is, the more heat that is generated in the voltage increasing circuit 12. Thus, the period for prohibiting the recharging is set to be longer when the preceding charge period of time is relatively long. Namely, in the example of FIG. 4, as the charging period indicated by symbol A2 is longer than the charging period indicated by symbol A1, the period of prohibition D2 for the latter recharge is longer than that for the former recharge D1.

Furthermore, in the present invention, it is deemed that the lower the voltage of the electricity source 17 is, the less heat that is generated in the voltage increasing circuit 12 is, thereby causing the period of prohibition for recharge to be relatively short. In FIG. 4, the periods for prohibition D1, D2 show the periods when the voltage of the power source 17 is relatively high. If the voltage of the power source 17 becomes relatively low, the current which flows through the voltage increasing circuit 12 becomes less, and the heat generated in the voltage increasing circuit 12 becomes less. Therefore, the periods for prohibition of recharging d1, d2 are set to be short; for example, in proportion to the voltage values of the power source 17.

Note that, in FIG. 4, the part indicated by a rightward ascending slant line shows the recharge prohibit period when the voltage of the power source 17 is relatively high, and the part indicated by a rightward descending slant line when the power source 17 is relatively low in voltage. Further, the circle marks indicate the light emissions of the flash.

After the prohibit period D1, or D2 has elapsed, it is deemed that the voltage increasing circuit 12 is fully heat-radiated, and that the recharging can be done at any time. If it is determined that flash light is necessary as a result of photometry by the photometric circuit 33, the recharge is commenced, and the voltage of main condenser 13 starts increasing as indicated by a symbol E.

After the voltage of the main condenser 13 has reached the second voltage, as indicated by symbol A3, the recharge prohibit period D3 responsive to the duration of the previous recharge time C3 is set in the same manner as described above. If the voltage of the power source 17 is lower, a shorter recharge prohibit period d3 is set in response to the voltage, and the prohibition and commencement of the recharge is performed in the same fashion.

Figure 5:
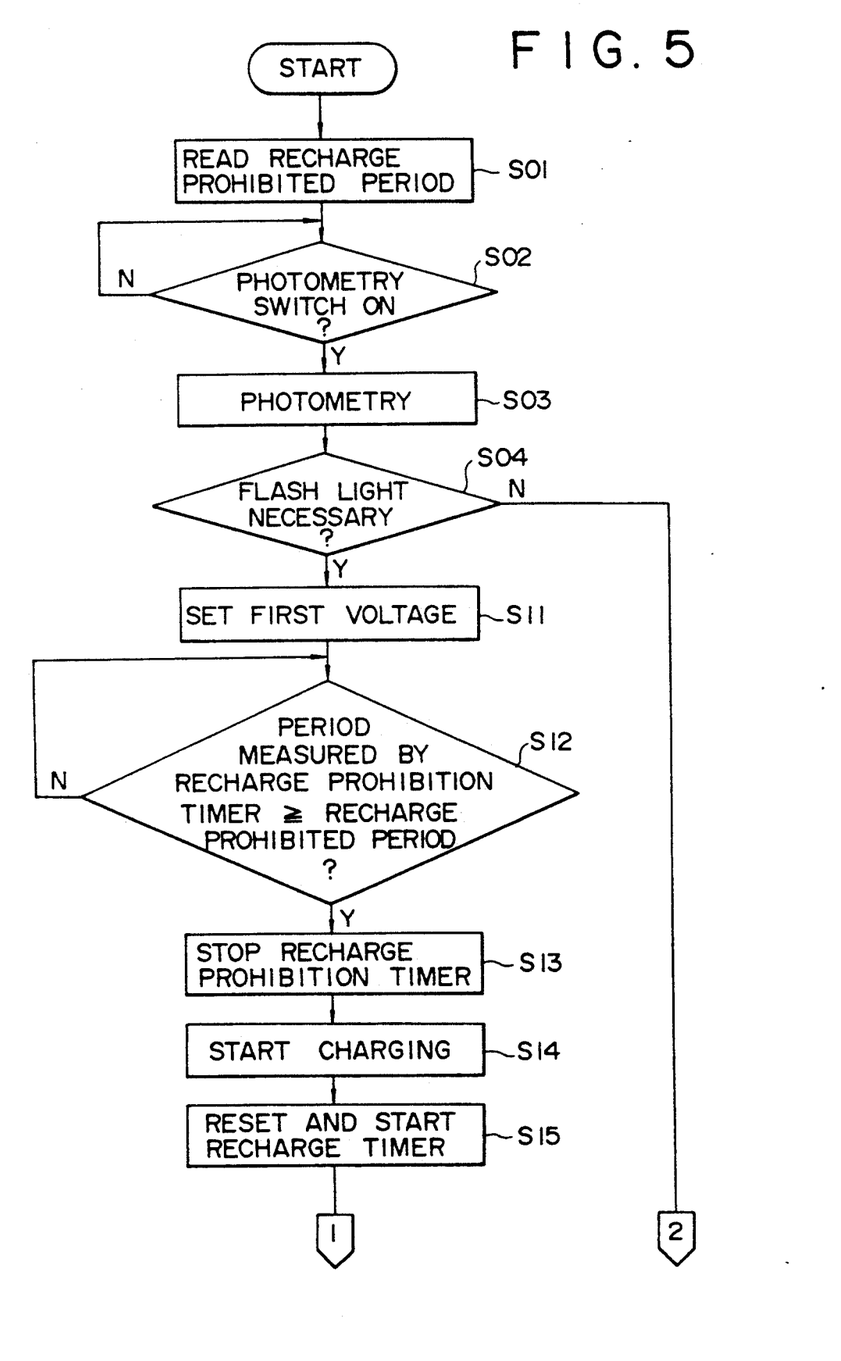
FIGS. 5 and 6 show a flow chart illustrating a control of the photographing of a camera according to the present invention.
Figure 6:
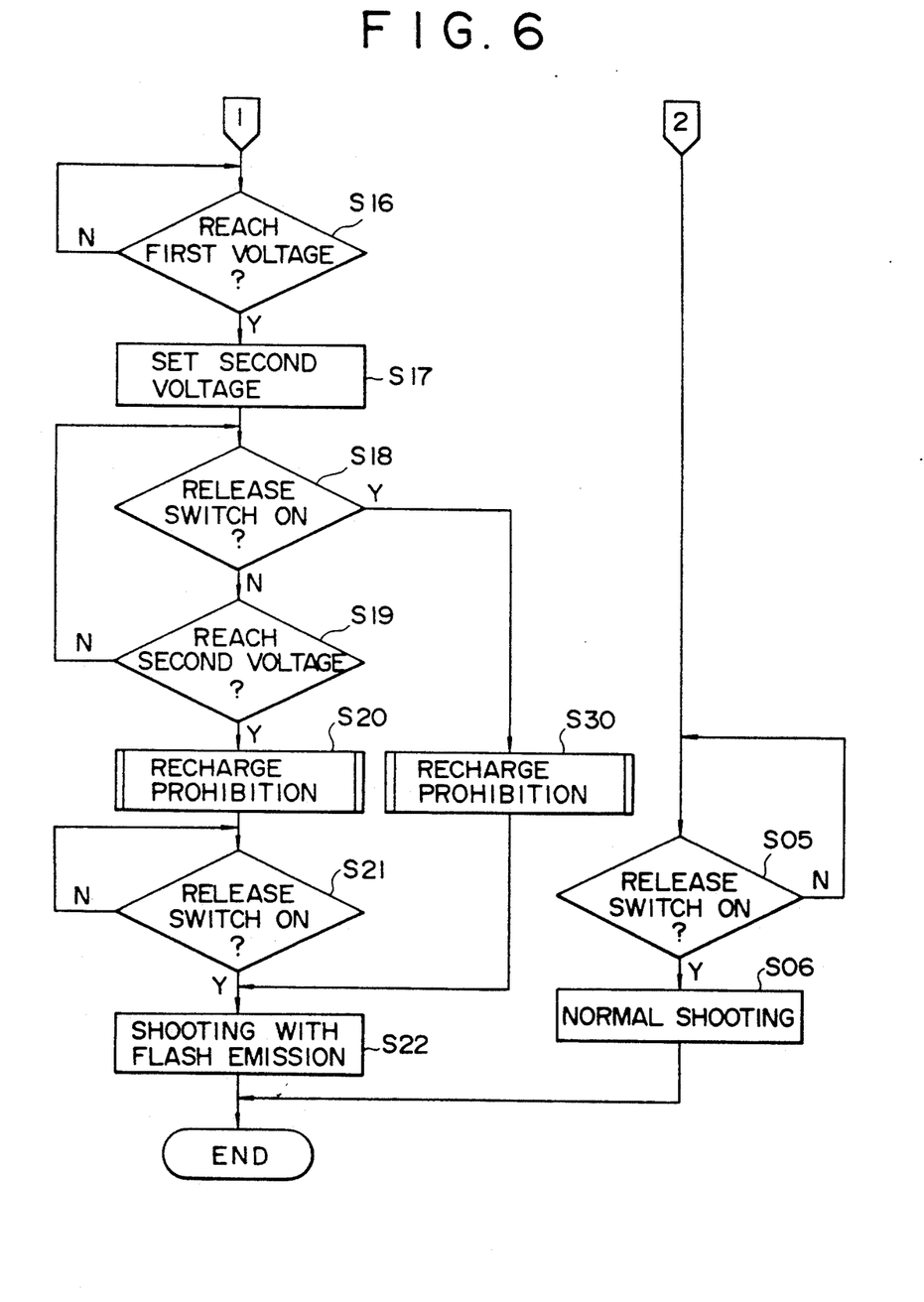

FIG. 5 and FIG. 6 are flow charts illustrating the control of photographic action in which the embodiment of the present invention is employed.

First of all, in Step S01, the recharge prohibit period is read from a memory. The recharge prohibited period is the period of time during which the recharge of the main condenser 13 is prohibited after the emission of the flash light. The recharge prohibited period has been stored in a memory in Step S36 of the recharge prohibition subroutine, which will be described later. It should be noted that the recharge prohibited period is set to 0 when initial settings are executed when a main switch of the camera is turned ON. In other words, the initial value for recharge prohibited period is 0.

The photometric switch 31 is turned ON when the release button 55 is depressed halfway. If the photometric switch 31 is turned ON, a photometric operation is carried out by the photometric circuit 33, and the luminance of an object is obtained (in steps S02 and S03). In accordance with the obtained luminance, it is determined whether the flash light is necessary in step S04. If it is determined that no flash light is used, it is detected whether the release button 55 is fully depressed and the release switch 32 is turned ON in step S05. If the release button 55 is fully depressed, a normal exposure control is performed, and photographic shooting is executed in accordance with the calculated aperture value and shutter speed in step S06. Thus, control of photographing is completed.

If it is determined that the flash light is necessary in step S04, a first voltage (i.e., 270 V) is set as a voltage to be detected by the charge voltage detecting circuit 16 in step S11. A period of time which is measured by a recharge prohibition timer 41, and the recharge prohibited period are compared in step S12. If it is determined that the period of time measured by the recharge prohibition timer 41 is equal to or larger than the recharge prohibit period, the recharge prohibition timer 41 is stopped (at step S13), the voltage increasing circuit is actuated, and charging of the main condenser 13 is started (at step S14). As described later, the recharge prohibition timer 41 is started in step S37 of the recharge prohibition subroutine (FIG. 7) and the recharge prohibition timer 41 measures the period of time that has elapsed since the recharge was prohibited. It should be noted that when the process of step S12 is executed the first time, the recharge prohibition timer 41 does not indicate the period of charge prohibition. However, in this embodiment, it is designed that the initial value of the recharge prohibition timer 41 has been set to 0 when the main switch of the camera is turned ON, and the recharge prohibit period has been set to 0 as aforementioned. Accordingly, the process advances to step S13.

Thus, the voltage of main condenser 13 is increased smoothly as indicated by symbols A1 and A2 in FIG. 4. A recharge timer 42 is reset and started in order to measure the period of time elapses in charging the main condenser 13 (at step S15). When the voltage of the main condenser 13 reaches the first voltage, a second voltage (i.e., 330 V) is set as a voltage to be detected by the voltage detecting circuit 16 (in steps S16 and S17).

At this stage, if the release switch 32 is in the ON state, i.e., if the release button 55 is fully depressed, the recharge prohibition subroutine (FIG. 7) is called. Subsequently, the xenon tube 14 is driven to emit light in step S22, and the exposure control is performed, thereby so that a photographic shooting is executed (through steps S18, S30 and S22). Namely, in the above described case, the voltage of the main condenser 13 is between the first voltage and the second voltage, and the xenon tube 14 emits light in correspondence with the voltage of the main condenser 13.

If the release switch 32 is not in the ON state at step S18, it is determined whether the voltage of the main condenser 13 reached the second voltage. Until the voltage of the main condenser 13 reaches the second voltage, processing of steps S18 and S19 are repeatedly executed. If it is detected that the release switch 32 is turned ON in step S18, the recharge prohibition subroutine is called. Thereafter, the photographic shooting with the flash light is executed.

If the main condenser is charged to the second voltage, the recharge prohibition subroutine is called. Thereafter, if the release switch is turned ON, the Xenon tube 14 is driven to emit light in Step S22. Thus, the photographic shooting with using the flash light is performed (through steps S19, S20, S21, and S22).

Figure 7:
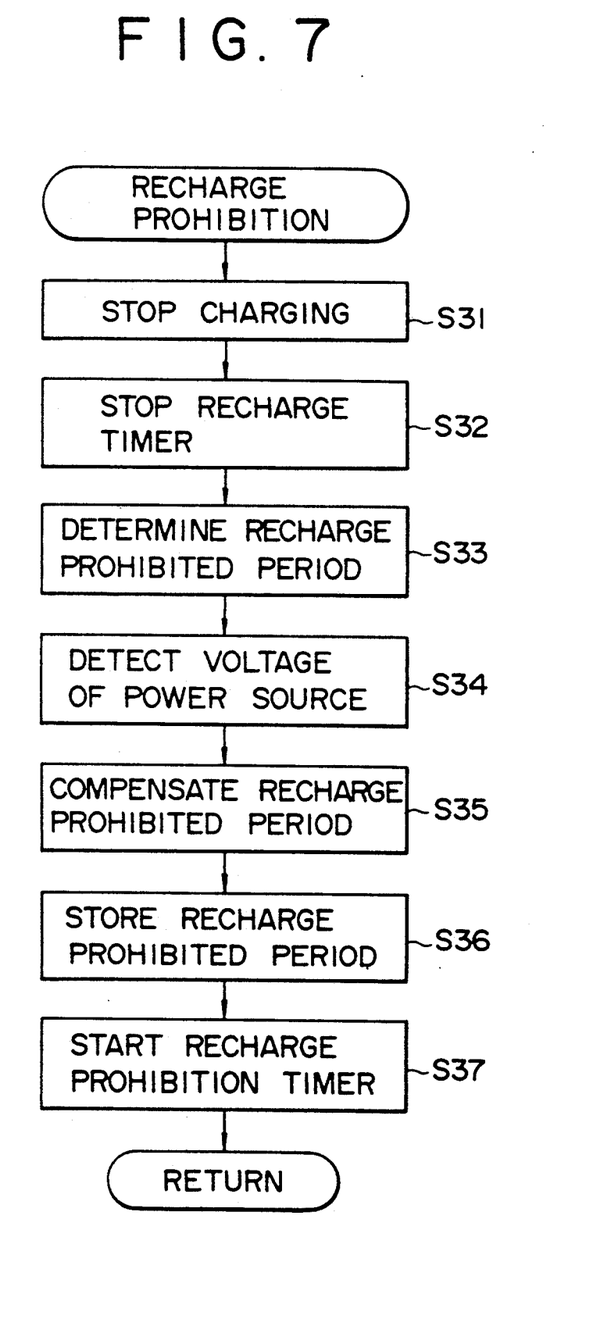
FIG. 7 is a flow chart illustrating a recharge prohibition subroutine.

FIG. 7 is a flow chart illustrating the recharge prohibition subroutine to be called in steps S20 or S30 of FIG. 6.

In step S31, a transistor of the voltage increasing circuit 12 is turned OFF and the recharge of the main condenser 13 is stopped. Then, the recharge timer 42 is stopped in step S32. Subsequently, the recharge prohibit period is determined in step S33. In the present invention, the recharge prohibit period is determined in such a fashion that the longer the period of time elapsed for charging, the longer the recharge prohibit period is. For example, the recharge prohibited period is obtained according to the following formula:

$$Tp = Tch \times 0.5$$

wherein
 Tp equals the recharge prohibit period; and
 Tch equals the period of time elapsed for charging. It should be noted that the formula is not limited to the above, but an adequate formula can be adopted depending on purposes.

Further, the voltage of the power source 17 is detected by the source voltage detecting circuit 18 (at step S34). Then, the recharge prohibit period is compensated in accordance with the source voltage (at step S35). Namely, in these processings, the recharge prohibit period is compensated in such a fashion that the lower the voltage of the power source, the shorter the recharge prohibited period is. For example, the compensation is performed in accordance with the following formula:

$$Tcp = Tp \times Vs/V\max$$

wherein
 Tcp equals the compensated recharge prohibited period;
 Tp equals the recharge prohibited period;
 Vs equals the detected voltage of the power source; and
 Vmax equals the maximum voltage of the power source.

Namely, the ratio between the actual voltage of the power source 17 source and the maximum voltage thereof is multiplied by the recharge prohibit period obtained at step S34.

The recharge prohibit period obtained as above is stored in a memory in step S36, which will be read out in step S01 of FIG. 5. Subsequently, the recharge prohibition timer 41 is reset and started in Step S37, so that the time elapsed after the prohibition of the recharge is measured. The measured value of the recharge prohibition timer 41 is compared with the recharge prohibited period, which has been set in advance, in step S12 of FIG. 5.

As described above, according to the present invention, it is deemed that the longer the period of time for charging the main condenser 13, the larger is the magnitude of heat generated in the voltage increasing circuit 12, and, it is so controlled that the recharging of the main condenser 13 is prohibited for a longer period of time to allow the heat to be sufficiently radiated. Accordingly, heat generation of the voltage increasing circuit 12 is sufficiently suppressed, and destruction of the voltage increasing circuit 12 is prevented. Further, if the heat generation is less, it is possible to commence the recharge relatively promptly after the flash light has been emitted, so that the flash device can be used repeatedly within a short period of time.

Furthermore, in the preferred embodiment, when the voltage of the power source is relatively low, the recharge prohibit period is set shorter because the current flow through the voltage increasing circuit 12 becomes less, it is deemed that the heat generation of the voltage increasing circuit 12 becomes less. Accordingly, the recharge prohibit period is suppressed to the minimum degree, and the flash device is set to the usable state as quickly as possible after the flash light emission.

Further, according to the present invention, there is no need to provide a circuit for detecting the temperature of the voltage increasing circuit in order to prevent the heat generation thereof. Accordingly, the flash device is can be made compact in size.

Furthermore, formulae for determining the recharge prohibited period employed in the above-mentioned embodiment are merely examples and adequate functions can be used as necessary.

As described above, according to the present invention, overheating of the voltage increasing circuit can be prevented, and moreover it is possible to commence the recharge of the condenser as quickly as possible after the flash light has emitted.

The present disclosure relates to a subject matter contained in Japanese Patent Application No. HEI 3-102197 (filed on Feb. 7, 1991) which is expressly incorporated herein by reference in its entirety.

What is claimed is:

1. A flashing device for emitting light, comprising means for emitting light, a condenser for being charged and supplying electricity to said light emitting means, and means for charging said condenser, said flashing device further comprising;
    means for measuring a charging period of a time necessitated for charging said condenser to at least a predetermined voltage;
    means for determining a charging prohibit period in accordance with said charging period measured by said measuring means; and
    means for prohibiting said charging of said condenser for said charging prohibit period that is determined by said determining means after said light emitting means emits light.

2. The flashing device of claim 1, further comprising:
    a power source for supplying electricity to said charging means;
    means for detecting a voltage of said power source; and
    means for compensating said charging prohibit period that is determined by said determining means in accordance with said voltage of said power source.

3. The flashing device of claim 1, wherein said determining means determines said charging prohibit period in such a fashion that the longer a charging period measured by said measuring means is, the longer said charging prohibit period is.

4. The flashing device of claim 2, wherein said compensating means compensates said charging prohibit period determined by said determining means in such a fashion that the lower said voltage of said power source is, the shorter said charging prohibit period is.

5. The flashing device of claim 1, wherein said charging means stops charging said condenser when said condenser is charged to another predetermined voltage which is higher than said predetermined voltage, and wherein said determining means determines said charging prohibit period when said charging of said condenser is stopped.

6. The flashing device of claim 1, wherein said determining means determines said charging prohibit period after said voltage of said condenser has reached said predetermined voltage and said emitting means is instructed to emit light.

7. The flashing device of claim 1, wherein said determining means determines said charging prohibit period in accordance with a formula:

$$Tp = Tch \times 0.5,$$

wherein
    Tp is said recharge prohibit period; and
    Tch is an elapsed period for charging said condenser.

8. The flashing device of claim 2, wherein said compensating means compensates said charging prohibit period in accordance with a formula:

$$Tcp = Tp \times Vs/Vmax,$$

wherein
    Tcp is said compensated charging prohibit period;
    Tp is said period determined by said determining means;
    Vs is a voltage detected by said means for detecting said voltage of said power source; and
    Vmax is a maximum voltage value of said power source.

9. A flashing device employed in a camera for emitting light towards an object, comprising means for emitting light, a condenser for being charged and supplying electricity to said means for emitting light, and means for charging said condenser, said flashing device further comprising:
    means for detecting a charged voltage of said condenser;
    means for measuring a charging period of time necessitated for charging said condenser to at least a predetermined voltage;
    means for determining a charging prohibit period in accordance with said charging period measured by said measuring means; and
    means for prohibiting said charging of said condenser for said charging prohibit period which is determined by said determining means after said light emitting means emits light.

10. The flashing device of claim 9, wherein said camera comprises means for determining whether flash light is to be emitted when a shooting is executed, and wherein said light emitting means emits light when it is determined by said determining means that said flash light is necessary and when a shutter of said camera is driven.

11. The flashing device of claim 10, wherein said light emitting means is capable of emitting light when said voltage of said condenser is higher than or equal to said predetermined voltage.

12. The flashing device of claim 11, wherein said charging means stops charging said condenser when said detecting means detects another predetermined voltage which is higher than said predetermined voltage.

13. The flashing device of claim 12, wherein said charging means stops charging said condenser when said shutter is driven.

14. The flashing device of claim 13, further comprising:
a power source for supplying electricity to said charging means;
means for detecting a voltage of said power source; and
means for compensating said charging prohibit period that is determined by said determining means in accordance with said voltage of said power source.

15. A method for controlling a charging means that is provided in a flashing device, the flashing device having a condenser for supplying electricity to means for emitting light, the condenser being charged by the charging means, and a power source for supplying electricity to the charging means, the method comprising the steps of:
charging the condenser;
detecting a charged voltage of the condenser;
measuring a charging period of time necessitated for charging the condenser to at least a predetermined voltage;
determining a charging prohibit period in accordance with the charging period; and
prohibiting the charging of the condenser for the charging prohibit period after the light emitting means emits light.

16. The method of claim 15, further comprising the steps of:
detecting a voltage of the power source; and
compensating the charging prohibit period in accordance with the detected voltage of the power source.

17. A camera having a flashing device for emitting light, comprising means for emitting light, a condenser for being charged and supplying electricity to said light emitting means, and means for charging said condenser, said camera further comprising:
means for detecting a charged voltage of said condenser;
means for measuring a charging period of time necessitated for charging said condenser to at least a predetermined voltage;
means for determining a charging prohibit period in accordance with said charging period measured by said measuring means; and
means for prohibiting said charging of said condenser for said charging prohibit period which is determined by said determining means after said light emitting means emits light.

18. The camera of claim 17, further comprising means for determining whether flash light is to be emitted when shooting is executed, and wherein said light emitting means emits light when it is determined by said determining means that said flash light is necessary and when a shutter of said camera is driven.

19. The camera of claim 17, further comprising:
a power source for supplying electricity to said charging means;
means for detecting a voltage of said power source; and
means for compensating said charging prohibit period that is determined by said determining means in accordance with said voltage of said power source.

20. A flashing device for emitting light, comprising means for emitting light, a condenser for being charged and supplying electricity to said light emitting means, and means for charging said condenser, said flashing device further comprising:
means for prohibiting said charging of said condenser for a predetermined period after said light emitting means emits light;
a power source for supplying electricity to said means for charging;
means for detecting a voltage of said power source; and
means for compensating said predetermined period in accordance with said voltage of said power source.

21. A flashing device for emitting light, comprising means for emitting flash light, a condenser that is charged to supply electricity to said light emitting means, and means for charging said condenser, said flashing device further comprising:
a power source for supplying electricity to said charging means;
means for determining a magnitude of a heat generated by said charging means;
means for inhibiting said charging of said condenser by said charging means in such a fashion that the more heat that is generated by said charging means, the longer a period of time for which said charging of said condenser by said charging means is inhibited; and
means for shortening said period of time for which said charging of said condenser by said charging means is inhibited in response to a decrease in a voltage of said power source.

22. The flashing device of claim 21, wherein said determining means determines said magnitude of said heat of said charging means such that the longer a period necessitated for charging said condenser, the more said heat generated by said charging means is, whereby said charging of said condenser by said charging means is inhibited such that the longer a period necessitated for charging said condenser, the longer said period for which said charging of said condenser by said charging means is inhibited.

23. A flashing device for emitting light, comprising means for emitting flash light, a condenser that is charged to supply electricity to said emitting means, and means for charging said condenser, said flashing device further comprising:
a power source for supplying electricity to said charging means;
means for determining a magnitude of a heat generated by said charging means;
means for inhibiting a charging operation of said charging means in accordance with said magnitude of said heat determined by said determining means; and
means for changing a period of time for which said charging of said condenser is inhibited in response to a voltage of said power source.

* * * * *